Figure 1:
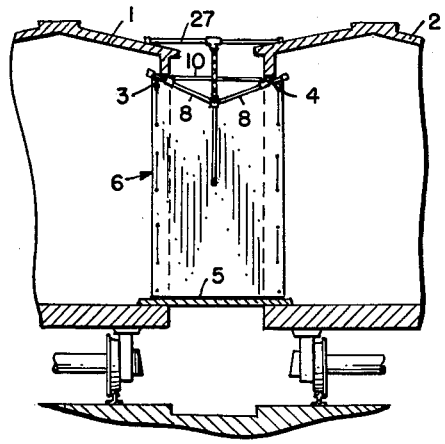

July 2, 1963

C. P. FROMMELT ETAL 3,095,886

WEATHER SHIELD

Filed Aug. 23, 1960

INVENTORS:
CYRIL P. FROMMELT
SYLVAN J. FROMMELT

BY *Margall Johnston, Cook & Root*

ATT'Y

United States Patent Office 3,095,886
Patented July 2, 1963

3,095,886
WEATHER SHIELD
Cyril P. Frommelt and Sylvan J. Frommelt, Dubuque, Iowa, assignors to Dubuque Awning & Tent Company, Dubuque, Iowa, a corporation of Iowa
Filed Aug. 23, 1960, Ser. No. 51,365
3 Claims. (Cl. 135—5)

This invention, in general, relates to improvements in canopies or covers for weather protection and to framework with means for quickly attaching and detaching said framework in door openings of various types of structures. The weather shields of this invention are particularly adapted for shielding a portable crosswalk by extending between freight cars in side by side relationship.

It is desirable under different types of weather conditions to provide a canopy or enclosure between a freight car and a loading dock or between side by side freight cars to sheild the open cars, the laborers loading or unloading said cars and/or the freight loads being handled. For example, under inclement weather, such as rain or snow, the crosswalk between railroad cars or between a railroad car and loading dock should be protected both for the benefit of the laborers and the protection of the loads which they carry. Similarly, it is desirable to provide an enclosure between the loading and unloading zones when transferring on warm days refrigerated or frozen products between refrigerated zones. The latter is desirable to prevent large heat gains by the warm air entering the refrigerated zones.

It is an object of this invention to provide a compact, canopy or enclosure to be used in conjunction with the loading or unloading of railroad freight cars or other mobile freight conveyances.

Another object of the invention is to provide weather shields which are quickly and easily attached to and removed from freight conveyances.

Still another object of the invention is to provide improvements in means for attaching a removable frame between adjacent structures. Other objects will appear hereinafter.

In accordance with the invention, a frame is quickly attached and detached from adjacent structure by a pair of supporting rods mounted on the frame. These supporting rods are rotatably mounted on the frame and are linearly movable with respect to the frame in a direction transverse to the axis of the rods. The linear movement of the supporting rods is biased in a manner to urge the rods toward the frame. In one combination of the invention the frame is constructed in a manner to support a lightweight cover or roof with side walls, preferably collapsible, so as to form an open-ended, three-sided enclosure.

In one of its aspects the framework serves to support a roof cover and a pair of side walls so as to form an enclosure having open ends, which is especially adapted to be used as a portable, detachable canopy or enclosure between the doors or openings of two adjacent structures. In one of its refinements, the canopy or enclosure serves as a weather shield about a loading crosswalk for railroad freight cars or other freight conveyances. The invention is especially applicable in providing a weather shield between side by side freight cars having a crosswalk over which freight loads are exchanged. The invention, however, can also be used to provide a portable, removable canopy or enclosure between railroad cars and loading docks, warehouses or the like and a railroad freight car in which the loading docks, warehouses or the like have a structure suitable for supporting one end of the weather shield.

Figure 2:
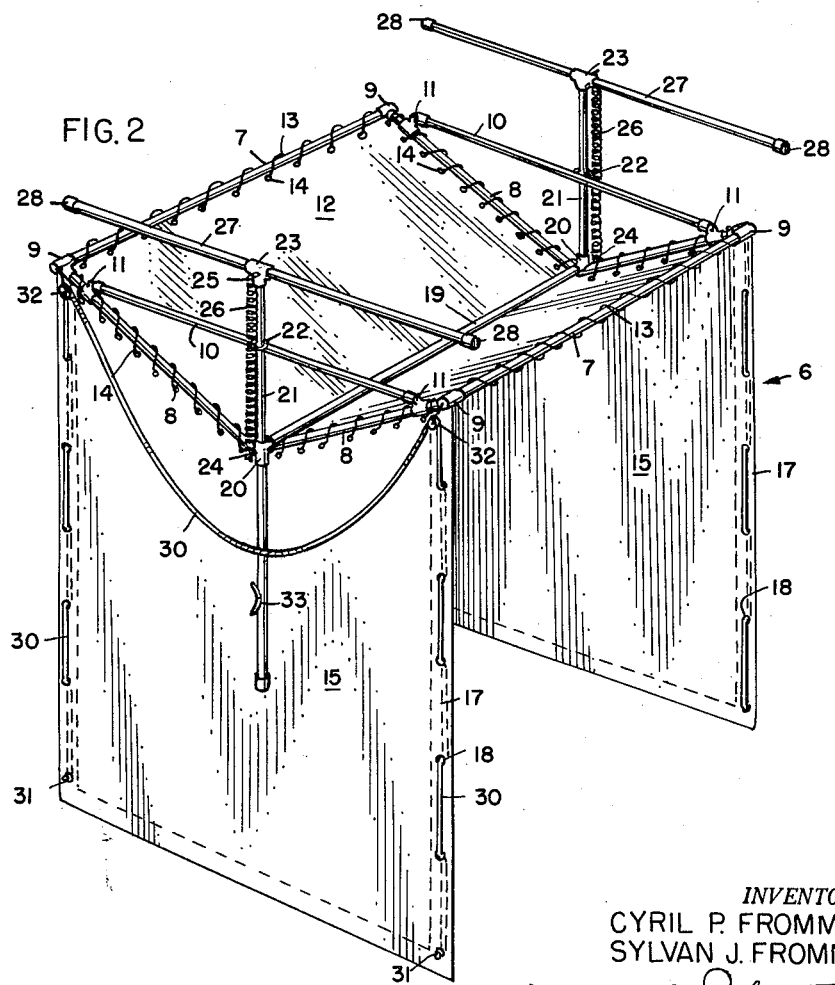

An embodiment of the invention is illustrated in the drawing wherein:

FIG. 1 is an end view in cross-section of two side by side railroad cars at the doors of said railroad cars with an embodiment of a weather shield of this invention attached to said railroad cars and forming a canopy or enclosure about a cross walk between said railroad cars; and FIG. 2 is a perspective view of the weather shield of FIG. 1.

Referring to the drawings, FIG. 1 shows railroad cars 1 and 2 in side by side relationship with their respective door openings 3 and 4 positioned opposite each other. A portable crosswalk 5 extends between the door openings. The area above the portable crosswalk 5 between the door openings 3 and 4 is enclosed by a weather shield designated generally at 6. The weather shield 6 extends a slight distance into the interior of the railroad cars.

The weather shield 6 has a rigid pipe framework made up of a pair of end pipes 7 and four downwardly sloping side pipes 8. The pipes at the four corners of the frame are rigidly connected with L-joints 9. The sloping of the roof cover 12 toward the center drains rain water and the like away from the door openings of the railroad cars.

Each pair of side pipes 8 are braced by bracing side pipes 10, the ends of which are connected with the side pipes 8 by hinge joints 11 fixedly secured about the end pipes 8. A roof cover 12 of canvas or other lightweight fabric or sheeting is supported on the pipes 7 and 8 by the cord 13 spirally wound about the pipes and extending through in each convolution a series of regularly spaced grommets 14 placed about the periphery of the roof cover 12. The spiral convolutions of the cord 13 along the pipes 8 also pass through grommets 14 spaced along the upper edge of side covers or walls 15. The side covers 15 are made of a flexible fabric or sheeting which can be folded or rolled so that the side walls may be collapsed for storage or raised, if desired, while the weather shield is in use.

The three free edges of each side cover 15 have a hem 17 containing at spaced intervals grommets 18. The purpose of these grommets is discussed at a later stage of the description of the invention.

A pipe 19 extends across the framework parallel with the end pipe 7 at the V-junctions of the pairs of side pipes 8 and is rigidly attached to the side pipes 8 by welding or other suitable means for attachment. The two ends of the pipe 19 have threaded thereon a slip T-connection 20 through each of which a vertically-positioned, longitudinally slidable pipe 21 extends. Each of the pipes 21 also extend through a slip eye or ring 22 mounted on the bracing pipe 10. The slip T-connections 20 and the slip eyes or rings 22 provide a two-point support for each of the pipes 21, each of which are slidable longitudinally with respect to the framework.

At the top end of each of the pipes 21 is a T-connection 23. Each slip T 20 has a protruding pin 24 and each T 23 has a protruding pin 25. A coil spring 26 is mounted between each pair of pins 24, 25 which serves as a bias or tensioning element to urge the T 23 and the rod or bar 27 extending horizontally for a distance substantially equal to the length of the sides of the weather shield 6 toward the framework. Rubber tips 28 are mounted over the ends of the rods or pipes 27.

Each pipe 21 is rotatable in its slip T support and its slip eye support so that the rods 27 can be rotated in a horizontal plane. The weather shield 6 is mounted in the door openings of adjacent railroad cars or other structures adapted to accommodate the supporting structure for the framework by two men, each holding one of the pipes 21. The framework is positioned so that the side pipes 7 are beneath or beyond the interior of the door openings. The supporting rods or pipes 27 are rotated to a position where they will pass between the adjacent structures. When the framework is raised until it contacts the upper side of the door openings, the pipes 21 are further raised to a height sufficient that the tips of the rods 27 are above the roofs or other protrusions on the adjacent structures above the door openings, in the case of FIG. 1, the roofs of the railroad cars 1 and 2, so that the rods 27 can be rotated to a position parallel in the vertical plane to the sides of the framework, the tips 28 of the rods 27 resting on the surface of the structure above the doors, in the illustrated case, the roofs of the railroad cars. The tension springs 26 cause the framework contacting the underside of the door openings and the rods 27 to exert a clamping action and securely hold the framework in position at the door openings. The weather shield 6 is removed from the door openings by the reverse procedure.

The side covers or curtains 15 can be raised by means of pull cord 30, which is a single cord knotted as at 31 or otherwise secured to a lower corner of the side cover or curtain and threaded upwardly through the grommets 18 on one side of the curtain. The cord passes over the pulley 32 at the same side of the curtain and thereafter crosses over to the pulley 32 at the other side of the curtain, upon which it is threaded through the grommets 18 on said other side of the curtain and knotted or otherwise secured to the lower corner of said other side of the curtain. The grommets are sufficiently large so that the cord threaded therethrough is slidable in the grommets. The curtain is raised by pulling downwardly at the middle of the cord 30, the curtain rising in the form of progressive folds. The curtain is held in its raised position by wrapping the rope around cleat 33 on the erection pole or pipe 21.

Thus, our invention provides a substantially rigid framework with means for readily attaching and detaching said framework on openings in various types of structures, such as railroad cars, buildings, trucks and the like. Our invention further provides a handy, easily erected enclosure for protecting the area between adjacent door openings and the like under adverse weather conditions and the like.

The invention is hereby claimed as follows:

1. A weather shield adapted to be quickly attached and detached to adjacent roofed structures, each structure having a side wall with an opening therein, said shield comprising a frame having a covering element thereon, said frame adapted to have opposed ends projecting into said openings, a pair of T-bars, one at each side of said frame, each T-bar comprising a vertical bar rotatably and slidably mounted on said frame and a cross bar attached to said vertical bar, the ends of which cross bar are adapted to engage the roofs of the structures and coact with the ends of the frame projecting into the openings to clamp said ends of said frame into engagement against the upper portions of said openings, and spring means connecting said T-bars and frame to continually urge said T-bars toward said frame.

2. A weather shield adapted to be quickly attached and detached to adjacent roofed structures, each structure having a side wall with an opening therein, said shield comprising a frame having a covering element thereon, said frame adapted to have opposed ends projecting into said openings, a pair of T-bars, one at each side of said frame, each T-bar comprising a vertical bar rotatably and slidably mounted on said frame and a cross bar attached to said vertical bar, the ends of which cross bar are adapted to engage the roofs of the structures and coact with the ends of the frame projecting into the openings to clamp said ends of said frame into engagement against the upper portions of said openings, spring means connecting said T-bars and frame to continually urge said T-bars toward said frame, and collapsible side curtains attached at each side of said frame.

3. A weather shield adapted to be quickly attached and detached to adjacent roofed structures, each structure having a side wall with an opening therein, said shield comprising a rectangular frame having a covering element including straight end frame members and V-shaped side frame members, a straight bracing bar at each side of the frame and attached at opposite ends at the end of said V-shaped side frame members, said frame adapted to have its opposed ends projecting into the structure openings, a pair of T-bars, one at each side of the frame, each T-bar comprising a vertical bar rotatably and slidably mounted on said frame and a cross bar attached to said vertical bar, the ends of which cross bar are adapted to engage the roofs of the structure and coact with the ends of the straight bracing bars projecting into the openings to clamp said ends of said frame into engagement against the upper portions of said openings, and springs connected between said T-bars and frame to continually urge the T-bars toward said frame.

References Cited in the file of this patent

UNITED STATES PATENTS

| | | |
|---|---|---|
| 849,791 | Jennings | Apr. 9, 1907 |
| 1,827,427 | Fincher | Oct. 13, 1931 |
| 1,988,260 | Berghoff | Jan. 15, 1935 |
| 2,255,837 | Volk | Sept. 16, 1941 |
| 2,293,329 | Coburn | Aug. 18, 1942 |
| 2,502,984 | Parmenter | Apr. 4, 1950 |
| 2,645,541 | Mintz et al. | July 14, 1953 |
| 2,809,649 | Druck | Oct. 15, 1957 |
| 2,891,615 | Farrell | June 23, 1959 |